US008514057B2

(12) United States Patent
Ponnuswamy

(10) Patent No.: US 8,514,057 B2
(45) Date of Patent: Aug. 20, 2013

(54) LOCATING DEVICES IN A WIRELESS NETWORK

(75) Inventor: Subburajan Ponnuswamy, Cupertino, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 201 days.

(21) Appl. No.: 12/947,579

(22) Filed: Nov. 16, 2010

(65) Prior Publication Data

US 2012/0119880 A1    May 17, 2012

(51) Int. Cl.
*G08B 5/22* (2006.01)

(52) U.S. Cl.
USPC ............... 340/8.1; 340/539.13; 340/539.23

(58) Field of Classification Search
USPC ............ 340/8.1, 10.1, 10.4, 572.1, 539.11, 340/539.13, 568.1, 10.33, 573.4, 540, 506
See application file for complete search history.

(56) References Cited

U.S. PATENT DOCUMENTS

| | | | |
|---|---|---|---|
| 2004/0078151 A1* | 4/2004 | Aljadeff et al. | 702/40 |
| 2006/0092016 A1* | 5/2006 | Modes et al. | 340/539.13 |
| 2010/0271186 A1* | 10/2010 | Tanaka et al. | 340/10.3 |

\* cited by examiner

*Primary Examiner* — Nabil Syed
(74) *Attorney, Agent, or Firm* — Blakely, Sokoloff, Taylor & Zafman LLP

(57) ABSTRACT

Determining the location of a wireless device to be located (DTL) by three or more locating devices (LDs). LDs operating at known locations estimate the distance to the DTL by sending wireless frames to the DTL and varying frame parameters such as transmit power and data rate, searching for the boundary at which the frame is or is not received and ACKd by the DTL. For a given set of frame parameters, the SNR required to be successfully received at the DTL is known. Given that the configuration of the LD is known, the EIRP of the DL is also known. Estimating the noise floor at the DTL, and using the SNR required to successfully receive the frame at the DTL and the EIRP at the LD transmitting the frame, the path loss can be calculated. From the path loss and operating frequency, a distance estimate is calculated. EIRP of the DTL is not and need not be known. Distance estimates from at least three LDs at known locations allow a location for the DTL to be calculated by a location engine (LE). Distance estimates from more than three LDs allow for an overdetermined solution. Distance estimates derived in this manner may be combined with distance estimates calculated using other approaches, such as measuring signal strengths, or TOA/TDOA measurements. The LE process may reside on a central controller supporting the LDs, on one of the LDs, or on any suitable device with network access.

21 Claims, 1 Drawing Sheet

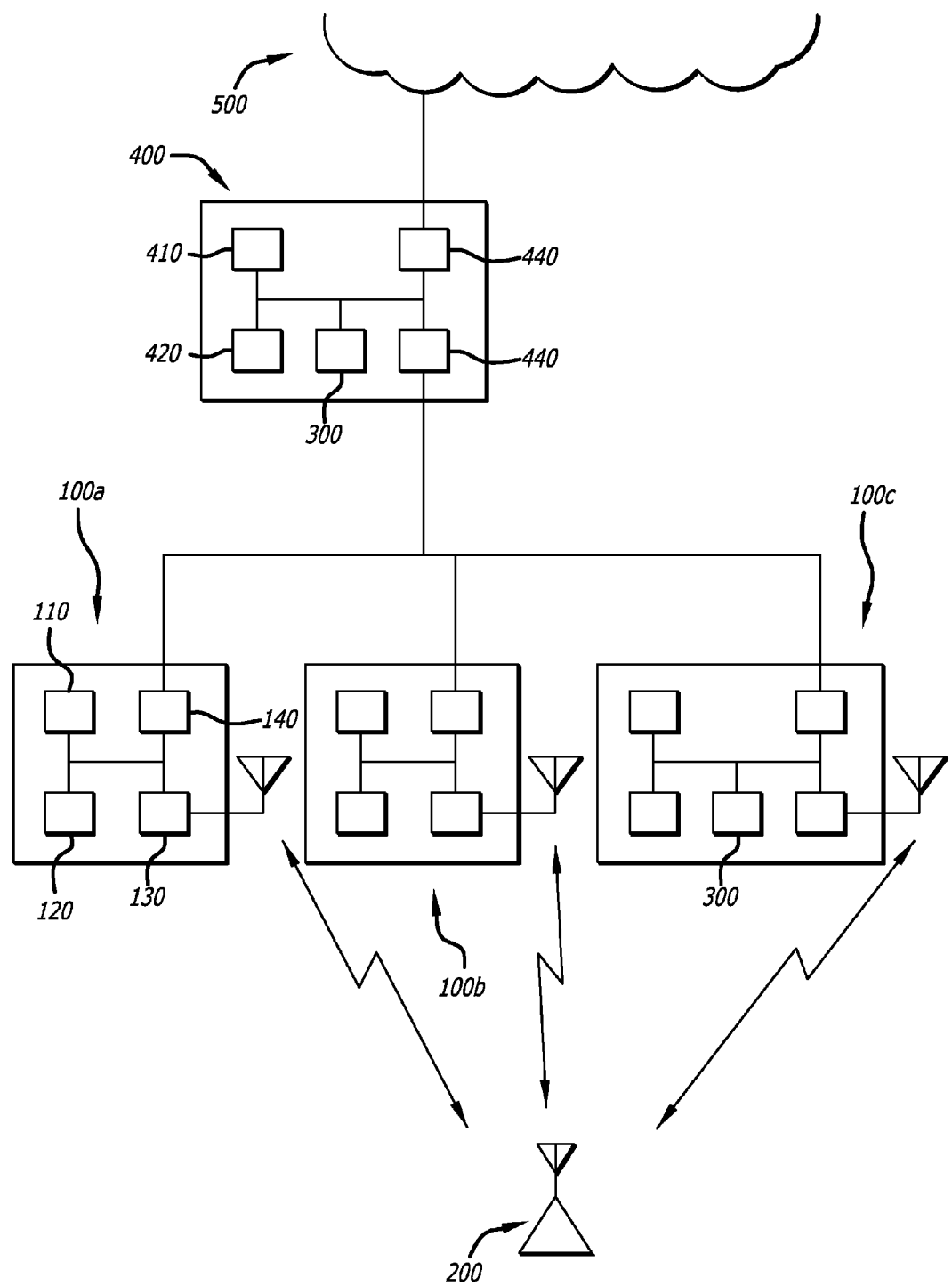

LOCATING DEVICES IN A WIRELESS NETWORK

BACKGROUND OF THE INVENTION

The present invention relates to wireless digital networks, and in particular, to the problem of locating a wireless device.

Determining the location of a wireless device is an old problem. Typical solutions rely on a number (greater than two) of locating devices (LD) at known locations. Each LD makes a measurement of some characteristic of a signal from the device to be located (DTL), where the measurement correlates to a distance estimate between the DT and the LD. Using distance estimates and locations from three LDs, a location for the DTL may be calculated. Using distance estimates and locations from more than three LDs, an overdetermined location for the DTL may be calculated.

One measurement which may be made by the LDs is the time of arrival of a signal transmitted by the DTL. As an example, LDs may time stamp the arrival of a particular part of a known frame transmitted by the DTL. To derive an accurate location, these time stamps must be synchronized, which may be accomplished using for example IEEE-1588 Time Synchronization to synchronize clocks of LDs on a common wired network. The resulting time difference of arrival (TDoA) measurements are used to calculate a location for the DTL, as taught for example in U.S. Pat. No. 7,630,728 to Cutler, et al.

Another approach is to use the signal strength of a DTL transmission as measured by each LD. Assuming the receive path from antenna through to signal strength measurement in the LD is properly characterized, DTL signal strength at the LD antenna may be estimated. Assuming the DTL is an isotropic radiator operating under known propagation conditions, the free space path loss (FSPL) which is a function of distance and frequency can be used to estimate distance differences among three or more LDs, allowing for a calculation of DTL location. The free space path loss model can also be replaced by other models that accurately represent the RF environment such as an office or a healthcare facility.

Similarly, if the effective radiated power (EIRP) of the DTL is known, the difference between this EIRP at the DTL and the signal strength at the LD can be turned into a distance estimate using the formula for the selected path loss model. Three or more of such distance estimates from LDs may be used to calculate DTL location. The EIRP of a DTL may be estimated, by example, from looking up its MAC OUI to retrieve the manufacturer and device type of the DTL if possible, and to perform a device lookup using this information to find the device EIRP. Device EIRP may also be estimated by device class or characteristics; as an example, Bluetooth devices operating according to the standard operate at one of a fixed number of power levels.

What is needed is a way to improve distance estimation of a DTL which does not directly rely on measuring DTL signal strength or signal-to-noise ratio at the LD.

BRIEF DESCRIPTION OF THE DRAWINGS

The invention may be best understood by referring to the following description and accompanying drawings that are used to illustrate embodiments of the invention in which:

FIG. 1 shows devices in a network.

DETAILED DESCRIPTION

Embodiments of the invention relate to methods of estimating the location of a wireless device operating in the range of a wireless digital network.

According to the present invention, a locating device (LD) attached to a network transmits frames to a device to be located (DTL) and receives an Acknowledgement (ACK) response when the frame has been received by the DTL without error. The LD varies transmission parameters of the frames transmitted to the DTL, looking for a change in the failure rate of the ACKs received from the DTL. Transmission parameters varied by the LD include transmit power, attenuation and transmit data rate. The LD searches this transmission parameter space looking for the critical level where the DTL goes from not being able to receive the frame to being able to successfully receive and acknowledge the frame. Since the signal level at the DTL to successfully decode a frame with a given set of parameters is known, and the transmit path and therefore the effective radiated power (EIRP) of the LD are also known, the effective path loss can be determined, and from the effective path loss, an estimate of the distance between LD and DTL calculated. Repeating this process over multiple LDs with known locations produces sufficient distance estimates to determine or overdetermine the location of the DTL without knowing or estimating the EIRP or signal strength of the DTL.

The location of the DTL is calculated by a location engine (LE) which commands LDs to make distance measurements to the DTL and return those results. The LE may be a process running on a central device such as a controller supporting the LDs, or the LE process may run on one of the LDs, or on any suitable device having network access.

FIG. 1 shows a network in which access points (APs) 100 used for locating devices (LDs) are purpose-made digital devices, each containing a processor 110, memory hierarchy 120, and input-output interfaces 130. In one embodiment of the invention, a MIPS-class processor such as those from Cavium or RMI is used. Other suitable processors, such as those from Acorn, Intel, or AMD may also be used. The memory hierarchy 120 traditionally comprises fast read/write memory for holding processor data and instructions while operating, and nonvolatile memory such as EEPROM and/or Flash for storing files and system startup information. Wired interfaces 140 are typically IEEE 802.3 Ethernet interfaces, used for wired connections to other network devices such as switches, or to a controller. Wireless interfaces 130 may be WiMAX, 3G, 4G, and/or IEEE 802.11 wireless interfaces. In one embodiment of the invention, APs operate under control of a LINUX operating system, with purpose-built programs providing host controller, LD, and access point functionality. Access points 100 typically communicate with a controller 400, which is also a purpose-built digital device having a processor 410, memory hierarchy 420, and commonly a plurality of wired interfaces 440. Controller 400 provides access to network 500, which may be a private intranet or the public internet. Controller 400 may host the Locating Engine process 300, or this process may be hosted on an AP/LD 100, or on any suitable device having network access.

Wireless device to be located (DTL) 200 has a similar architecture, chiefly differing in input/output devices; a laptop computer will usually contain a large LCD, while a handheld wireless scanner will typically have a much smaller display, but contain a laser barcode scanner.

According to the present invention, a plurality of LDs 100 at known locations develop distance estimates to DTL 200. The distance estimates from LDs 100 and their known locations are used by location engine (LE) 300 to determine the location of DTL 200.

Estimating location of a wireless device by triangulation is a known art. A signal from the Device To be Located (DTL) needs to be received by at least three Locating Devices (LD).

When a LD receives a signal from the DTL at a measured signal strength or signal to noise ratio (SNR), the distance is estimated based on the propagation characteristics of the environment, transmit/receive antenna gains and the estimated transmit power at the DTL. From the estimated EIRP of the DTL and the measured signal strength or SNR at the LD, a figure for path loss is calculated. Path loss combined with propagation characteristics and the operating frequency are used to calculate the distance estimate. The distance estimation using this technique is inherently inaccurate as the RF characteristics of the environment greatly influence the propagation and attenuation of the signals from/to DTL. Moreover, the actual antenna gain and the transmit power of the DTL, needed to calculate its EIRP, may not be known.

LDs trying to locate the DTL can actively transmit a frame requiring an Acknowledgment (ACK) such as the IEEE 802.11 NULL-DATA frame. This elicits an ACK from the DTL which can be used to measure the SNR and/or signal strength to be used in the distance estimation.

The method according to the present invention may be used alone or may be used with the above signal strength based techniques to determine the location of the DTL. While a minimum of three distance estimates are required for determining location, more than three estimates may be used to overdetermine a location solution.

Typical wireless devices such as the IEEE 802.11 devices support multiple data rates (e.g. modulation and coding rates), where the reliable reception of each rate requires a specific SNR. When the SNR falls below the required value, the receiver is unable to receive the frame at the specific rate and therefore unable to ACK the frame. The transmitting device typically scales down the rate (rate control) to increase the reliability of transmissions.

The present invention makes use of the fact that a specific SNR is required to receive a frame transmitted at a specific data rate or modulation and coding rate. The SNR requirements for the same date rate or modulation and coding rate may also vary slightly across devices depending on the type and manufacturer of the device.

The LDs trying to locate the DTL also know their own antenna gain and transmit power and therefore can accurately calculate the EIRP of every frame transmitted.

According to the present invention, the LDs transmit frames starting at a specific data rate (depending on the capability of the DTL), and subsequently modifies the data rate to determine the data rate at which the DTLs ability to receive is fully or partially affected. For example, the LD may start with 1 Mbps and determine that up to 9 Mbps, the DTL is able to receive the frame whereas at 12 Mbps the DTL is unable to receive or the percentage of success is very low. Similarly the LD may start from 54 Mbps or 130 Mbps and reduce the rate until it determines that 9 Mbps works and 12 Mbps does not.

The LD may use a frame such as NULL-DATA frame which does not affect the higher layer protocols. The NULL-DATA frame can be sent to any device, even those that are not associated with the LD. If the LD is already communicating with the DTL, the information gathered from the rate control procedure can be used instead of explicitly sending the NULL-DATA or other frames.

The LD estimates the SNR at the DTL based on the above test and SNR tables. Example tables are shown as Table 1 and Table 2. In the above examples, the estimated SNR is between 5 and 7 dB. Depending on the failure rate, the actual SNR may be estimated by assigning specific weights to failure rates. For example, if 12 Mbps is not reliable, but 9 Mbps is reliable, and if there was a 100% failure at 12 Mbps, the estimated SNR could be 5.5 dB. If the failure rate is 50% the estimated SNR could be 6 dB, if the failure rate is 30% the estimated SNR could be 6.5 dB and so on Since the required SNR (e.g., 5-7 dB) is known, the actual SNR can be estimated based on the failure rate.

From the SNR at the DTL, the signal strength at the DTL is calculated. In order to calculate the signal strength at the DTL, the noise floor at the DTL need to be estimated. The nominal noise floor or known noise floor may be estimated based on DTL characteristics, for example using a lookup table based on the MAC OUI or manufacturer of the DTL.

Alternatively, the measured noise floor on nearby devices (such as other 802.11 APs) may be used to calculate the actual signal strength at the DTL.

Alternatively, the noise floor may be obtained directly from the DTL using one of the noise measurement frames as defined in IEEE 802.11k or IEEE 802.11v standards amendments.

The SNR and/or signal strength at the DTL may also be directly obtained using one of the receiver power measurements reports as defined in IEEE 802.11k or IEEE 802.11v standards amendments, such as the Received Channel Power Indicator (RCPI), Received Signal-to-Noise Indicator (RSNI) or Receive Power Indication (RPI) histogram report.

Since the transmit power, antenna gain and any internal loss at the transmitting LD are known, the EIRP of the frames can be calculated (as Transmit Power+Antenna Gain−Loss on the transmit path). From the EIRP at the LD and the signal strength at the DTL, the distance between the device and DTL is calculated. For example, Transmitter EIRP−Receiver Signal Strength=Propagation Loss. Distance is derived from Propagation Loss and operating frequency.

Note that in this approach the signal strength or EIRP of the DTL need not be known or measured.

In one method, the LE uses at least three LDs incorporating the above method to transmit frames at various rates to estimate the distance from the LD to the DTL.

In another method, SNR/signal strength measurements used in triangulation are enhanced to estimate a better estimate of the distance. The current distance estimate uses the SNR/signal strength as seen by at least three LDs (e.g., $S\_1a$, $S\_1b$ and $S\_1c$). Using the above method we will have the SNR/signal strength as seen by the DTL from at least three LDs (e.g., $S\_a1$, $S\_b1$ and $S\_c1$). The actual signal strength can be the minimum, maximum or average of these two values depending on the RF environment and type of DTL. In this method, no changes are necessary to the triangulation algorithms. The location engine receives a more accurate estimate of the SNR/signal strength.

In another embodiment, the LDs do not need to use a linear or binary search of the rates to determine the rate at which the communication between the LD and LTD breaks. Instead, the LDs use the SNR of the frames received from DTL (either a frame initiated by the DTL or from ACK generated in response to a NULL-DATA or another frame transmitted by the LD) as a starting point to determine the range of data rates to be attempted. For example, if the measured SNR from the DTL is 13 dB, the DL may try rates ranging from 18 Mbps to 24 Mbps or other MCS requiring SNR that is within a few dBs of the measured SNR. This method essentially narrows down the range of rates to be tried.

In another embodiment, the data rate along with the actual transmit power of the LD radio are changed to further control the actual EIRP of the transmitted frames. Since the power can be varied per-frame, the LD may chose to change the power instead of the rate or power in addition to the rate.

In another embodiment, multiple LDs, including those that are not operating on the channel that the DTL is operating, coordinate to initiate one of the above methods to accurately locate the DTL. The coordination may be triggered by the LE or by a user by selecting a specific DTL though a user interface or command line interface. The LDs may exchange messages using a wired or wireless link to coordinate.

In another embodiment, since the LD calculates the effective SNR or signal strength at the DTL, this calculated signal strength at the DTL may be used to estimate the distance between the LD and the DTL.

While an embodiment of the invention is presented using APs on a network as LDs, since APs in a wireless network operate from known locations and with known configurations, in an 802,11 embodiment of the invention any 802.11 device with a known configuration and location can perform the functions of an LD. As an example, a handheld or laptop computer with an 802.11 wireless interface could act as both the locating engine 300 and a locating device 200, communicating with other LDs 200 on the network.

The present invention may be realized in hardware, software, or a combination of hardware and software. The present invention may be realized in a centralized fashion in one computer system such as AP 100, or in a distributed fashion where different elements are spread across several interconnected computer systems. A typical combination of hardware and software may be a controller or access point with a computer program that, when being loaded and executed, controls the device such that it carries out the methods described herein.

The present invention also may be embedded in nontransitory fashion in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

TABLE 1

802.11 n single and dug-stream rate

| Number of streams | 20 MHz Rate (Mbps) | 40 MHz Rate (Mbps) | 40 MHz SGI Rate (Mbps) | Min. Required SNR (dB) |
|---|---|---|---|---|
| 1 | 6.5 | 13.5 | 15 | 5 |
|  | 13 | 27 | 30 | 7 |
|  | 19.5 | 40.5 | 45 | 9 |
|  | 26 | 54 | 60 | 12 |
|  | 39 | 81 | 90 | 16 |
|  | 52 | 108 | 120 | 20 |
|  | 58.5 | 121.5 | 135 | 21 |
|  | 65 | 135 | 150 | 23 |
| 2 | 13 | 27 | 30 | 10 |
|  | 26 | 54 | 60 | 13 |
|  | 39 | 81 | 90 | 15 |
|  | 52 | 108 | 120 | 16 |
|  | 78 | 162 | 180 | 21 |
|  | 104 | 216 | 240 | 26 |
|  | 117 | 243 | 270 | 27 |
|  | 130 | 270 | 300 | 29 |

TABLE 2

802.11 a/b/g rates

| Rate (Mbps) | 1 | 2 | 5.5 | 11 | 6 | 9 | 12 | 18 | 24 | 36 | 48 | 54 |
|---|---|---|---|---|---|---|---|---|---|---|---|---|
| Min. Required SNR (dB) | 4 | 6 | 8 | 10 | 4 | 5 | 7 | 9 | 12 | 16 | 20 | 21 |

I claim:

1. A non-transitory machine readable medium comprising a set of instructions which, when executed by one or more hardware precessors causes a set of operations to be performed comprising:
    transmitting a first plurality of frames from a first device to a second device, wherein a first frame of the first plurality of frames is transmitted at a first value for a particular transmission parameter, and wherein a second frame of the first plurality of frames is transmitted at a second value for the particular transmission parameter that is different than the first value;
    for each of the first plurality of frames: determining if a corresponding Acknowledgement (ACK) frames, as defined by IEEE 802.11 standards, is received by the first device from the second device;
    based on the IEEE 802.11 ACK frames received by the first device from the second device, calculating a distance estimate from the first device to the second device;
    transmitting a second plurality of frames from a third device to the second device, wherein a first frame of the second plurality of frames is transmitted at the third value for the particular transmission parameter and a second frame of the second plurality of frames is transmitted at a fourth value for the particular transmission parameter different than the third value;
    for each of the second plurality of frames: determining if a corresponding Acknowledgement (ACK) frames, as defined by IEEE 802.11 standards, is received by the third device from the second device;
    based on the ACK frames, as defined by the IEEE 802.11 standards, that were received by the third device from the second device: calculating a distance estimate from the third device to the second device;
    based at least on (a) the distance estimate between the first device and the second device and (b) the distance estimate between the third device and the second device: calculating a location of the second device.

2. The machine readable medium of claim 1, wherein at least one IEEE 802.11 ACK frame, used to calculate the distance estimate from the first device to the second device, has a 01 type value and a 1101 subtype value.

3. The machine readable medium of claim 1, wherein at least one of the first plurality of frames is a NULL-DATA frame.

4. The machine readable medium of claim 1, wherein the operations further comprise:
    determining a distance estimate between a fourth device and the second device;
    determining a location estimate of the second device based on: (a) the distance estimate between the first device and the second device, (b) the distance estimate between the third device and the second device, and (c) a distance estimate between the fourth device and the second device.

5. The machine readable medium of claim 1, wherein the particular transmission parameter is a power level for transmitting the first plurality of frames from the first device to the second device.

6. The machine readable medium of claim 1, wherein the particular transmission parameter is a data transmission rate for transmitting the first plurality of frames from the first device to the second device.

7. A system comprising:
a first device comprising a hardware processor;
the system being configured to perform operations comprising:
transmitting a first plurality of frames from the first device to a second device, wherein a first frame of the first plurality of frames is transmitted at a first value for a particular transmission parameter, and wherein a second frame of the first plurality of frames is transmitted at a second value for the particular transmission parameter that is different than the first value;
for each of the first plurality of frames: determining if a corresponding Acknowledgement (ACK) frames, as defined by IEEE 802.11 standards, is received by the first device from the second device;
based on the IEEE 802.11 ACK frames received by the first device from the second device, calculating a distance estimate from the first device to the second device;
transmitting a second plurality of frames from a third device to the second device, wherein a first frame of the second plurality of frames is transmitted at a third value for the particular transmission parameter and a second frame of the second plurality of frames is transmitted at a fourth value for the particular transmission parameter different than the third value;
for each of the second plurality of frames: determining if a corresponding Acknowledgement (ACK) frame, as defined by IEEE 802.11 standards, is received by the third device from the second device;
based on the ACK frames, as defined by the IEEE 802.11 standards, that were received by the third device from the second device: calculating a distance estimate from the third device to the second device;
base at least on (a) the distance estimate between the first device and the second device and (b) the distance estimate between the third device and the second device: calculating a location of the second device.

8. The system of claim 7, wherein at least one IEEE 802.11 ACK frame, used to calculate the distance estimate from the first device to the second device, is an IEEE 802.11 control frame with a 01 type value and a 1101 subtype value.

9. The system of claim 7, wherein at least one of the first plurality of frames is a NULL-DATA frame.

10. The system of claim 7, wherein the system further comprises a fourth device, and wherein the operations further comprise:
determining a distance estimate between a fourth device and the second device;
determining a location estimate of the second device based on: (a) the distance estimate between the first device and the second device, (b) the distance estimate between the third device and the second device, and (c) a distance estimate between the fourth device and the second device.

11. The system of claim 7, wherein the particular transmission parameter is a power level for transmitting the first plurality of frames from the first device to the second device.

12. The system of claim 7, wherein the particular transmission parameter is a data transmission rate for transmitting the first plurality of frames from the first device to the second device.

13. A method comprising:
transmitting a first plurality of frames from a first device to a second device, wherein a first frame of the first plurality of frames is transmitted at a first value for a particular transmission parameter, and wherein a second frame of the first plurality of frames is transmitted at a second value for the particular transmission parameter that is different than the first value;
for each of the first plurality of frames: determining if a corresponding Acknowledgement (ACK) frame, as defined by IEEE 802.11 standards, is received by the first device from the second device;
based on the IEEE 802.11 ACK frames received by the first device from the second device, calculating a distance estimate from the first device to the second device;
transmitting a second plurality of frames from a third device to the second device, wherein a first frame of the second plurality of frames is transmitted at a third value for the particular transmission parameter and a second frame of the second plurality of frames is transmitted at a fourth value for the particular transmission parameter different than the third value;
for each of the second plurality of frames: determining if a corresponding Acknowledgement (ACK) frame, as defined by IEEE 802.11 standards, is received by the third device from the second device;
based on the ACK frames, as defined by the IEEE 802.11 standards, that were received by the third device from the second device: calculating a distance estimate from the third device to the second device;
based at least on (a) the distance estimate between the first device and the second device and (b) the distance estimate between the third device and the second device: calculating a location of the second device;
wherein the first device comprises a hardware processor.

14. The method of claim 13, wherein at least one IEEE 802.11 ACK frame, used to calculate the distance estimate from the first device to the second device, has a 01 type value and a 1101 subtype value.

15. The method of claim 13, wherein at least one of the first plurality of frames is a NULL-DATA frame.

16. The method of claim 13, wherein the method further comprises:
determining a distance estimate between a fourth device and the second device;
determining a location estimate of the second device based on: (a) the distance estimate between the first device and the second device, (b) the distance estimate between the third device and the second device, and (c) a distance estimate between the fourth device and the second device.

17. The method of claim 13, wherein the particular transmission parameter is a power level for transmitting the first plurality of frames from the first device to the second device.

18. The method of claim 13, wherein the particular transmission parameter is a data transmission rate for transmitting the first plurality of frames from the first device to the second device.

19. The method of claim 13, wherein calculating the distance estimate from the first device to the second device based on the IEEE 802.11 ACK frames received by the first device comprises: (a) identifying a particular frame of the first plurality of frames with a lowest transmit power for which a corresponding IEEE 802.11 ACK was received by the first device and (b) calculating the distance estimate based on a particular distance associated with the lowest transmit power.

20. The machine readable medium of claim 1, wherein calculating the distance estimate from the first device to the second device based on the IEEE 802.11 ACK frames received by the first device comprises: (a) identifying a particular frame of the first plurality of frames with a lowest transmit power for which a corresponding IEEE 802.11 ACK was received by the first device and (b) calculating the distance estimate based on a particular distance associated with the lowest transmit power.

21. The system of claim 7, wherein calculating the distance estimate from the first device to the second device based on the IEEE 802.11 ACK frames received by the first device comprises: (a) identifying a particular frame of the first plurality of frames with a lowest transmit power for which a corresponding IEEE 802.11 ACK was received by the first device and (b) calculating the distance estimate based on a particular distance associated with the lowest transmit power.

* * * * *